Figure 1:
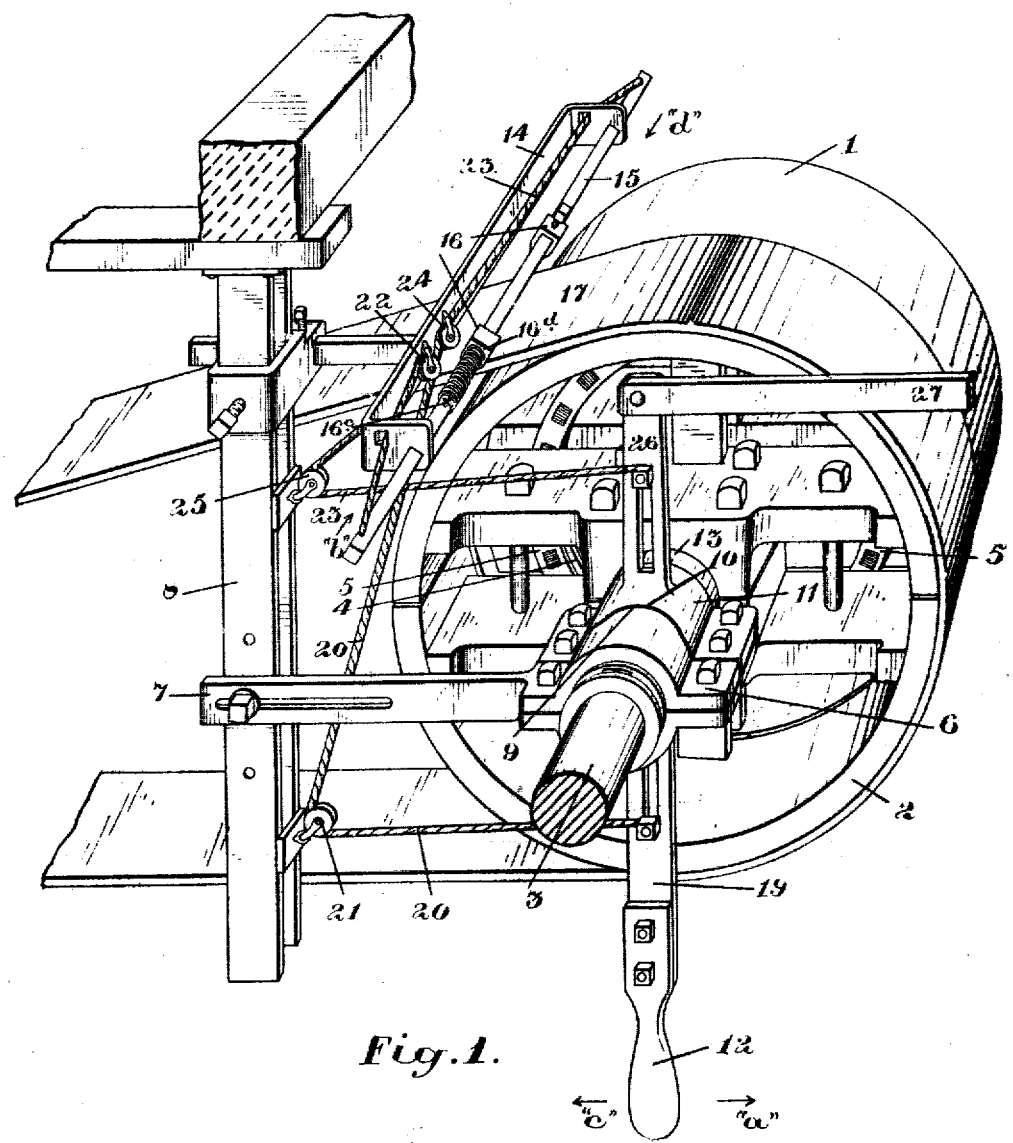

No. 816,022. PATENTED MAR. 27, 1906.
A. J. LINDSAY.
POWER TRANSMISSION MEANS.
APPLICATION FILED JAN. 11, 1905.

2 SHEETS—SHEET 1.

Witnesses.
H. L. Trimble
L. F. Rock

Inventor:
Anson J. Lindsay
by Chas. Ellis
his attorneys

No. 816,022. PATENTED MAR. 27, 1906.
A. J. LINDSAY.
POWER TRANSMISSION MEANS.
APPLICATION FILED JAN. 11, 1905.
2 SHEETS—SHEET 2.
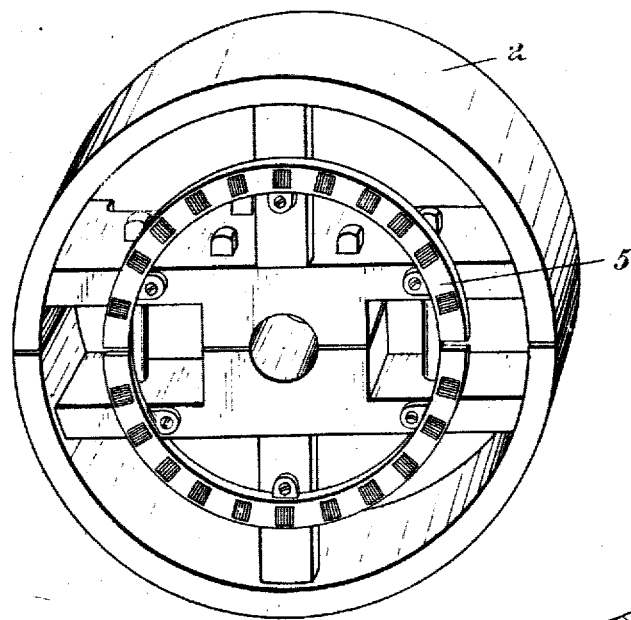
Fig. 2.
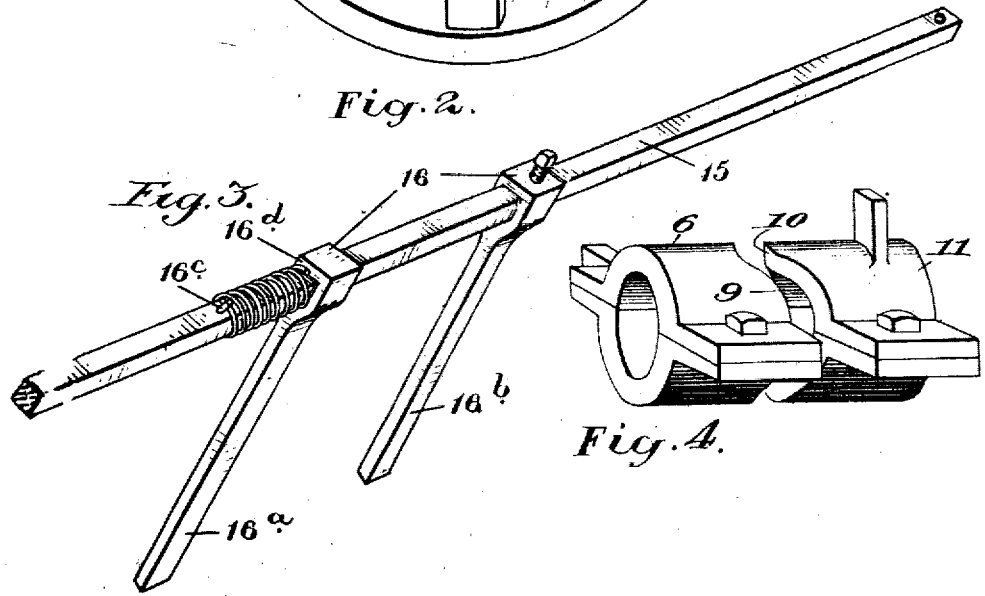
Fig. 3.
Fig. 4.
Witnesses.
Inventor.

UNITED STATES PATENT OFFICE.

ANSON JOHN LINDSAY, OF TORONTO, CANADA.

POWER-TRANSMISSION MEANS.

No. 816,022.

Specification of Letters Patent.

Patented March 27, 1906.

Application filed January 11, 1905. Serial No. 240,630.

*To all whom it may concern:*

Be it known that I, ANSON JOHN LINDSAY, of the city of Toronto, in the county of York and Province of Ontario, Canada, have invented certain new and useful Improvements in Power-Transmission Means; and I hereby declare that the following is a full, clear, and exact description of the same.

This invention relates to a power-transmission means in which the dead pulley is mounted beside the live pulley upon the line-shaft and positioned to revolve with the live pulley or line-shaft by the actuation of the operating-lever, which positions the belt-shifting means to transfer the belt from the dead pulley to the live pulley.

For a full understanding of the invention reference is to be had to the following description setting forth one means by which it may be carried into practice and to the accompanying drawings, illustrating the same, in which—

Figure 1 is a perspective view of a portion of the line-shaft, showing the live and dead pulleys, the belt, and belt-shifting means, and the operating means for actuating the belt-shifting means and positioning the dead pulley to revolve with the line-shaft or live pulley. Fig. 2 is a perspective view of one of the pulleys, showing one of the clutch members, the clutch member for the other pulley being similar to that illustrated in this view. Fig. 3 is a perspective view of a part of the belt-shifter, and Fig. 4 is a similar view of the cams for positioning the dead pulley on the line-shaft.

Like figures of reference refer to like parts throughout the specification and drawings.

The live and dead pulleys 1 and 2, respectively, are mounted upon the line-shaft 3, with clutch members 4 and 5 forming part of or attached to their adjacent faces, so that the dead pulley may revolve with the live pulley when the clutch members 4 and 5 are in engagement. The live pulley 1 is mounted to revolve with the line-shaft, and the dead pulley 2 is loosely mounted and longitudinally movable on the line-shaft, so that it will remain stationary, except when the clutch members 4 and 5 are in engagement. To effect the longitudinal movement of the dead pulley, the line-shaft upon the outer side of the dead pulley is loosely encircled by a collar 6, having an arm 7 attached to part of the framing 8 to hold the collar 6 immovable in its set position. The collar 6 has a cam 9, with which engages a cam 10 on the hub 11 of the operating-lever 12, interposed between the collar 6 and the hub 13 of the dead pulley 2, with both of which it is constantly in contact. The cams 9 and 10 are so formed that when the lever 12 is moved in either direction from the position shown in Fig. 1 of the drawings they will displace the hub 11 from its neutral position and press it in the direction of the dead pulley 2 and cause it to move the dead pulley toward the live pulley 1, so that the clutch members 4 and 5 will engage and cause the dead and live pulleys to revolve together until the operating-lever has been returned to its neutral position, when the dead pulley will return to the position from which it has been displaced.

Attached to the framing 8 is a guide-arm 14, arranged, preferably, parallel with the line-shaft 3 and slightly above the belt as it passes over the upper portion of the pulleys 1 and 2, and longitudinally movable through the guide-arm 14 is the shifting-bar 15, having the usual belt-engaging fork 16 embracing the belt 17 to transfer it from one pulley to the other. Attached to one arm 19 of the operating-lever is one end of a shifting-cord 20, which passes around two idlers 21 and 22, suspended, respectively, from the framing 8 and guide-arm 14, the opposite end of the cord being attached to one end of the shifting-bar 15.

Attached to the other end of the shifting-bar 15 is one end of a second shifting-cord 23, which passes around two idlers 24 and 25, suspended, respectively, from the guide-arm 14 and framing 8, the opposite end of the cord being attached to the other arm 26 of the operating-lever. By moving the operating-lever in the direction indicated by arrows marked *a* the tension on the shifting cord 23 is relieved and the shifting cord 20 is caused to draw the shifting-bar in the direction indicated by arrows marked *b* to move the belt from the dead pulley 2 toward the live pulley 1. As it is an impossibility from a practical mechanical standpoint to shift the belt from the dead pulley to the live pulley while the former is stationary, it is necessary to start the revolution of the dead pulley, so that its motion may be imparted to the belt to enable the shifting-bar to successfully perform the function of shifting the belt from the dead to the live pulley, and this is attained by utilizing the operating-lever to actuate the belt-shifting means and simultaneously move the dead pulley toward the live pulley, so as to cause the engagement of the clutch members of the two pulleys. As an interval of time must elapse between the movement of the belt-shifting means and the commencement of the revolution of the dead pulley, it is advisable in order to compensate for this difference in time to make the finger 16ª of the belt-engaging fork longitudinally movable on the shifting-bar 15, so that as the shifting-bar moves in the direction of the arrow marked b the finger 16ª will remain stationary against the adjacent edge of the belt and allow the shifting-bar to pass through the finger-hub 16ᵈ and complete its movement in that direction without being retarded by the inactivity of the belt, and to employ a pressure-spring to engage the finger 16ª and a corresponding retainer 16ᶜ on the shifting-bar 15 to press the finger toward its neutral position, the spring having sufficient strength to counteract the resistance of the belt and enable the finger to move the belt from the dead to the live pulley as the dead pulley commences its revolution.

To transfer the belt from the live to the dead pulley, the operating-lever is moved in the direction of the arrows marked c, which releases the tension upon the shifting-cord 20 and causes the shifting-cord 23 to draw the shifting-bar in the direction of arrows marked d, so that the finger 16ᵇ will engage and shift it from the live pulley 1 to the dead pulley 2.

Connected to the operating-lever is a connecting means 27, leading to any part of the premises to facilitate the actuation of the operating-lever. By mounting the live and dead pulleys upon the line-shaft and transferring the belt from the live pulley to the dead pulley it is possible to render the belt inactive, except when revolving with the live pulley, such inactivity of the belt naturally reducing the wear and correspondingly increasing the length of its life and the life of the driven parts, as the belt when on the dead pulley is unable to transmit motion to the other pulley or pulleys around which it is revoluble.

Having thus fully described my invention, what I claim as new, and desire to secure by Letters Patent, is—

1. A power-transmission means comprising a line-shaft, a live pulley revoluble therewith, a dead pulley loosely mounted on the line shaft and arranged to be shifted longitudinally thereon to revolve with the live pulley, an operating-lever having a hub revolubly mounted on the line-shaft to engage the hub of the dead pulley and cause it to revolve with the live pulley, and a belt-shifter positioned by the actuation of the operating-lever.

2. A power-transmission means comprising a line-shaft, live and dead pulleys mounted thereon, a shifting-lever to position the dead pulley to revolve with the live pulley, and a belt-shifter comprising a shifting-bar, and a belt-engaging fork composed of a stationary finger immovably connected to the shifting-bar, a movable finger having a hub adjustable on the shifting-bar, an immovable stop on the shifting-bar on the outside of the movable finger, and a tension-spring bearing against the immovable stop and movable finger to press it toward the edge of the belt and allow it to yield at the commencement of the initial movement of the shifting-bar.

3. A power-transmission means comprising a line-shaft, a live pulley revoluble therewith, a dead pulley loosely mounted on the line-shaft, and arranged to be shifted longitudinally thereon to revolve with the live pulley, a belt-shifter, and an operating-lever having a hub loosely mounted on the line-shaft normally contacting the hub of the dead pulley to position the dead pulley to revolve with the live pulley and actuate the belt-shifter.

4. A power-transmission means comprising a line-shaft, a live pulley revoluble therewith, a dead pulley loosely mounted on the line-shaft and arranged to be shifted longitudinally thereon to revolve with the live pulley, a belt-shifter, an operating-lever having a hub loosely mounted on the line-shaft normally contacting the hub of the dead pulley, connecting means for the belt-shifter and operating-lever, a cam forming part of the hub of the operating-lever, a stationary cam loosely encircling the line-shaft to engage the first-mentioned cam and move the hub longitudinally on the line-shaft to position the dead pulley to revolve with the live pulley during the movement of the lever when actuating the belt-shifter.

5. A power-transmission means comprising a line-shaft, a live pulley revoluble therewith, a dead pulley loosely mounted on the line-shaft and arranged to be shifted longitudinally thereon to revolve with the live pulley, and an operating-lever having a hub, loosely mounted on the line-shaft normally contacting the hub of the dead pulley to position the dead pulley to revolve with the live pulley during the operation of the lever and arms extending radially from the hub, in combination with a belt-shifter comprising a slideway, a shifting-bar movable therein having belt-engaging forks to embrace the opposite sides of the belt and flexible connecting means attached to the ends of the shifting-bar and to the arms of the operating-lever.

6. A power-transmission means comprising a line-shaft, a live pulley revoluble therewith, a dead pulley loosely mounted on the line-shaft and arranged to be shifted longitudinally thereon to revolve with the live pulley, and an operating-lever having a hub, loosely mounted on the line-shaft normally contacting the hub of the dead pulley to position the dead pulley to revolve with the live pulley during the operation of the lever and arms extending radially from the hub, in combination with a belt-shifter comprising a slideway, a shifting-bar movable therein having belt-engaging forks to embrace the opposite sides of the belt and flexible connecting means attached to the ends of the shifting-bar and to the arms of the operating-lever one of the fingers of the belt-engaging fork being longitudinally movable upon the shifting-bar, and a pressure-spring to normally hold the finger in engagement with the belt and arranged to allow the finger to yield during the initial movement of the shifting-bar.

7. In a power-transmission means the combination of the line-shaft, a live pulley mounted to revolve with the line-shaft, a dead pulley loosely mounted and longitudinally movable on the line-shaft, a clutch means to cause the dead pulley to revolve in conjunction with the line-shaft and live pulley, a belt-shifting means and an operating means to actuate the belt-shifting means and position the dead pulley to be engaged by the clutch means, consisting of a stationary cam member located beyond the outer face of the dead pulley, and an operating-lever the hub of which is loosely mounted on the shaft constantly engaging the hub of the dead pulley and having a cam member to engage the stationary cam member.

8. In a power-transmission means the combination of the line-shaft, a live pulley mounted to revolve with the line-shaft, a dead pulley loosely mounted and longitudinally movable on the line-shaft, a clutch means to cause the dead pulley to revolve in conjunction with the line-shaft and live pulley, a suitably-supported guide-arm, a shifting-bar longitudinally movable through the guide-arm, idlers, flexible connections passing over the idlers and connected to the shifting-bar, an operating-lever loosely mounted on the shaft having two arms to which are attached the flexible connections and a hub one side of which is normally in contact with the hub of the dead pulley and the other side of which is provided with a cam member and a stationary cam member normally engaging the cam member of the operating-lever.

9. A power-transmission means comprising a line-shaft, a live pulley revoluble therewith, a dead pulley loosely mounted on the line-shaft and arranged to be shifted longitudinally thereon to revolve with the live pulley, an operating-lever having a hub loosely mounted on the line-shaft normally contacting the hub of the dead pulley to position the dead pulley to revolve with the live pulley when the operating-lever is actuated, a cam forming part of the outer end of the hub, a stationary cam opposed to the hub-cam to cause the displacement of the hub to shift the dead pulley on the line-shaft during the actuation of the operating-lever, in combination with the belt-shifter comprising a stationary slideway, a shifting-bar therefor, a belt-engaging fork for the shifting-bar consisting of two fingers one of which is longitudinally movable on the shifting-bar, a spring to maintain the movable finger in its normal position and arranged to yield during the initial movement of the belt-shifter and flexible connections for the shifting-bar and operating-lever.

Toronto, January 3, 1905.

ANSON JOHN LINDSAY.

In presence of—
  C. H. RICHES,
  L. F. BROCK.